329
United States Patent

Brumm

[15] 3,690,344

[45] Sept. 12, 1972

[54] SILENT FLEXIBLE TUBE TYPE VALVE
[72] Inventor: Richard S. Brumm, Orinda, Calif.
[73] Assignee: Grove Valve and Regulator Company, Oakland, Calif.
[22] Filed: Feb. 8, 1971
[21] Appl. No.: 113,519

[52] U.S. Cl. .............137/625.28, 251/5, 251/61.1, 251/DIG. 2
[51] Int. Cl. .............................................F16k 7/07
[58] Field of Search...................251/61.1, 5, DIG. 2; 137/625.3, 625.28

[56] References Cited

UNITED STATES PATENTS

| 3,522,926 | 8/1970 | Bryant | 251/5 |
| 2,939,672 | 6/1960 | Rich | 251/5 |
| 3,467,131 | 9/1969 | Ratelband | 251/5 X |

*Primary Examiner*—Arnold Rosenthal
*Attorney*—Melvin R. Stidham

[57] ABSTRACT

A valve including a flexible tube normally firmly engaged around a cylindrical member, as by means of a control pressure, to prevent fluid flow through radial openings through the member. When the tube is progressively forced away from the surface of the member, as by overcoming the control pressure, flow through the member to a downstream flow passage is initiated. The flow openings are formed by a series of closely axially spaced, thin annular members providing a high length-to-cross section ratio between them. The annular members may be formed non-planar to increase the length of the flow path within the radial space requirements.

10 Claims, 7 Drawing Figures

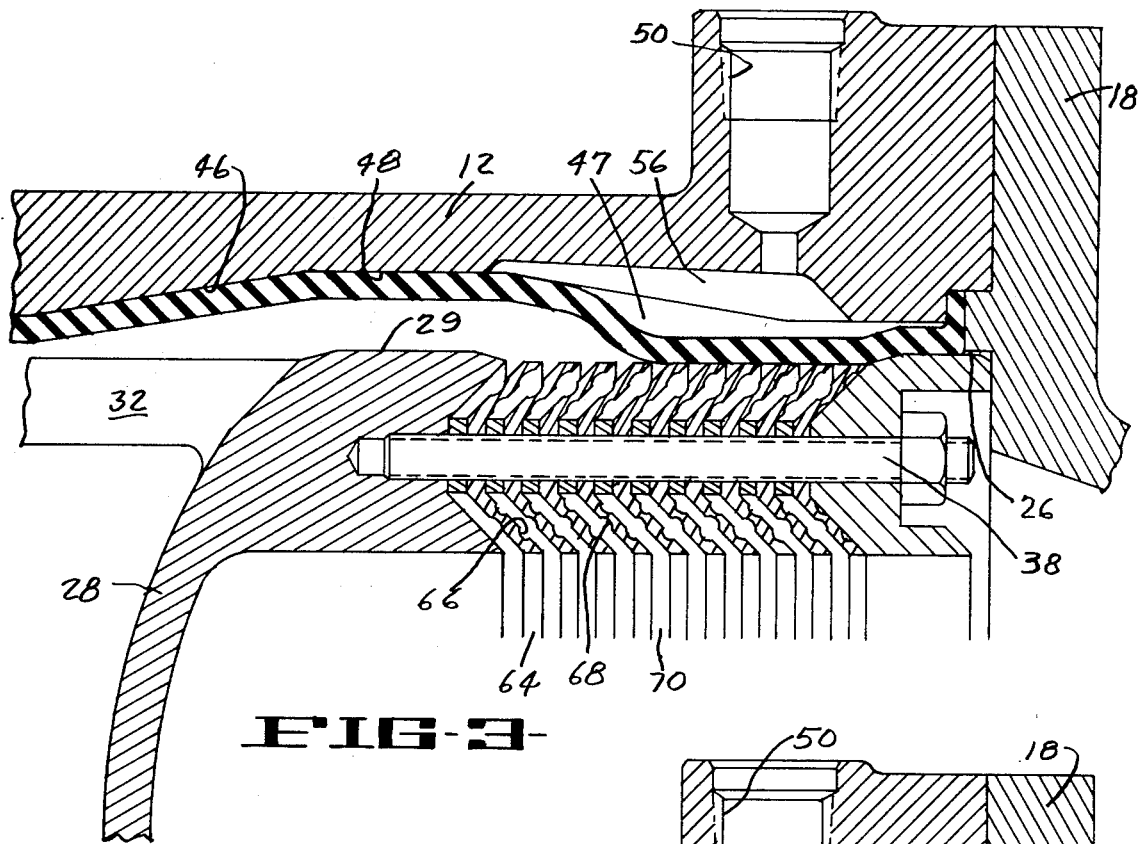
FIG-3-
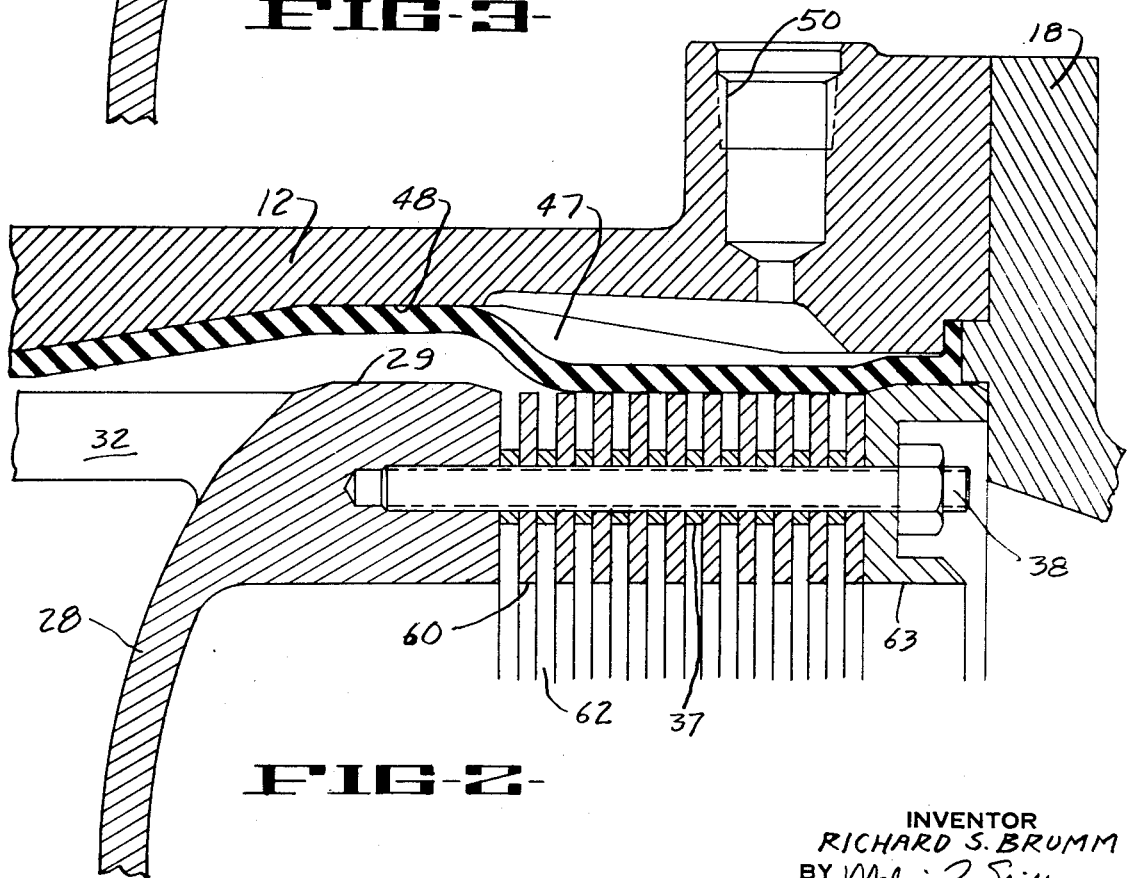
FIG-2-

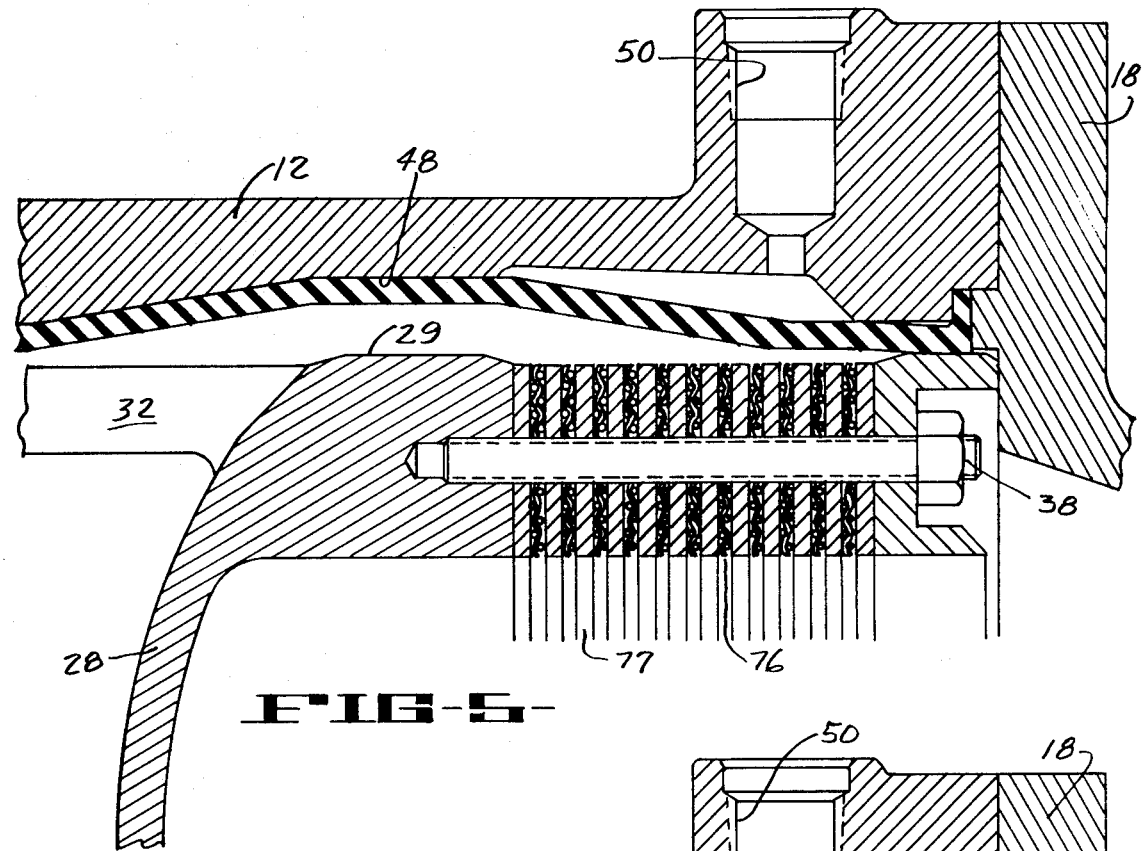
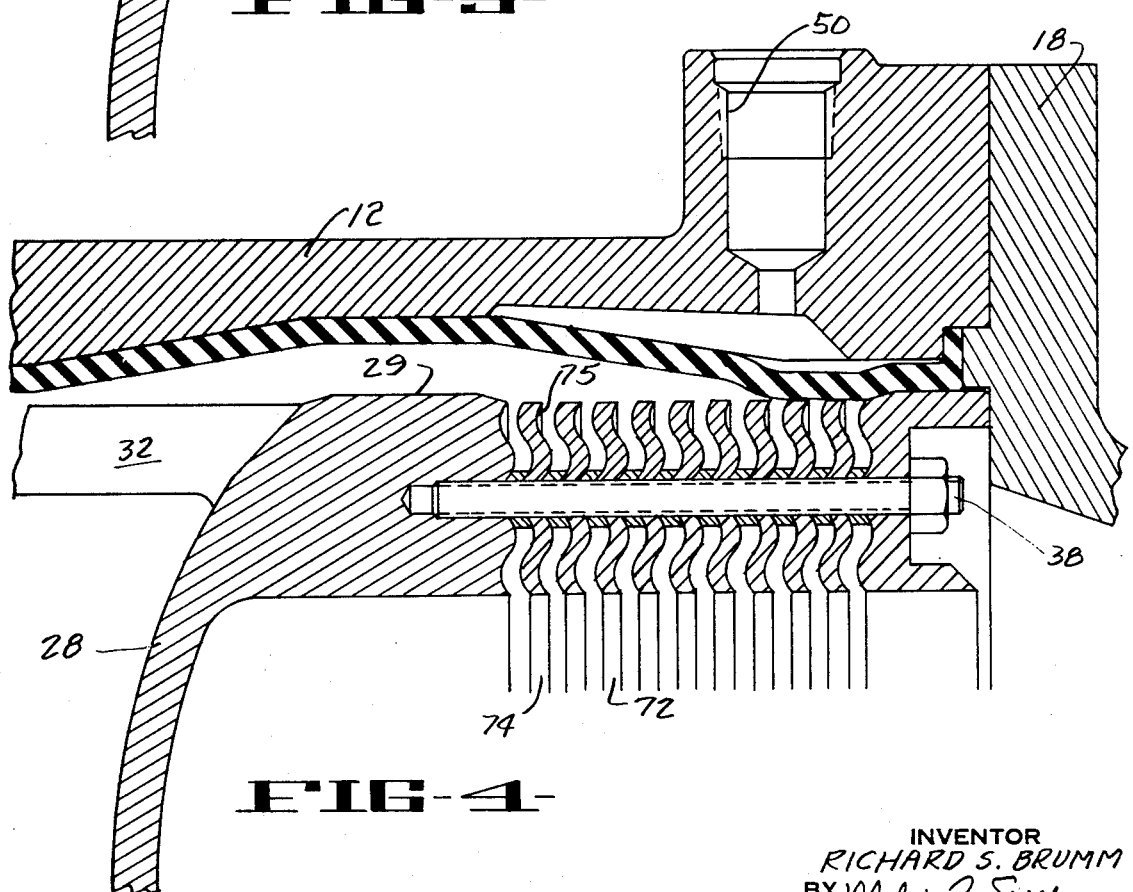

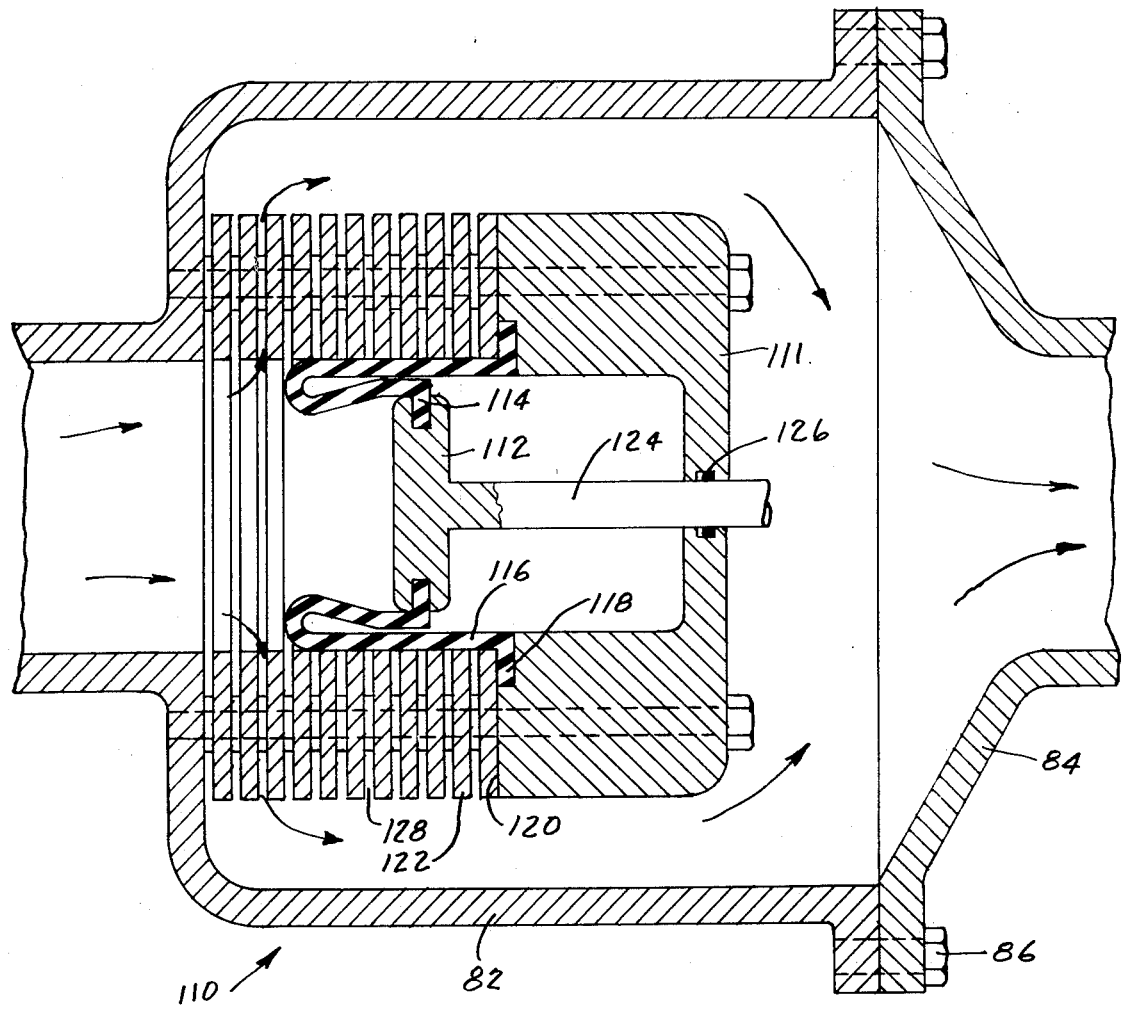
FIG-7-

SILENT FLEXIBLE TUBE TYPE VALVE

BACKGROUND OF THE INVENTION

This invention relates to a silent flexible tube type valve and, more particularly, to a flexible tube valve with flow paths having a high length-to-cross section ratio.

In a preferred expansible tube type valve configuration, and expensive tube is carried on a cylindrical core sleeve which has two axially spaced inlet and outlet series of through openings around it with an intermediate barrier blocking the flow axially through the core sleeve. A control pressure fluid is in a jacket around the tube normally to prevent expansion of the tube away from the core sleeve barrier. The control pressure fluid may be introduced from the upstream line so that pressures inside and outside of the tube are balanced. In such cases, the tension in the tube stretched over the core sleeve maintains the tube sealed around the barrier. A duct, which is connected to a low pressure zone, may be brought into communication with the jacket to bleed the jacket and enable the upstream pressure within the tube to overcome the now-lower jacket control pressure and flow around the barrier to the downstream line. Particularly at high pressures, the sudden, high velocity flow may generate an objectionably high noise level.

OBJECTS OF THE INVENTION

It is an object of this invention to provide a flexible tube valve with means to minimize noise level during operation.

It is a further object of this invention to provide a flexible tube valve with means for greatly retarding the velocity of fluid flow therethrough.

It is a further object of this invention to provide a flexible tube valve with means for retarding fluid flow with progressively increasing flow capacity as the flexible tube is distorted toward full open configuration.

Other objects and advantages of this invention will become apparent from the detailed description to follow when read in conjunction with the accompanying drawing.

BRIEF SUMMARY OF THE INVENTION

In accordance with this invention, the expansible tube type valve may in some embodiments comprise a flexible, expansible tube stretched over a cylindrical core sleeve having consecutively, a series of upstream flow openings, a cylindrical barrier blocking axial flow and a series of downstream openings to the outflow passage. The expansible tube is sealed between the core and the housing at both ends so that flow is possible only be stretching the tube away from the central barrier, whereby upstream fluid may flow out through the upstream slots around the barrier and back in through the downstream slots.

In a chamber or jacket around the tube, a control pressure normally prevents expansion of the tube for flow of fluid. However, when the downstream pressure falls below a predetermined level, the jacket may be bled to a zone of low pressure, enabling upstream pressure to expand the tube and commence flow.

This invention contemplates the formation of at least one of the series of flow openings through the core by the provision of a plurality of thin, closely spaced annular members providing flow paths between them. The flow paths have a high length-to-cross sectional dimension ratio to retard velocity and minimize noise level. The annular members may be bent or otherwise formed in non-planar configuration to further lengthen the flow path within the radial space requirements.

BRIEF DESCRIPTION OF THE DRAWING

FIGS. 2, 3, 4, and 5 are enlarged partial section views showing other velocity retarding embodiments;

FIG. 7 is a section view of a rolling, flexible tube type valve

DESCRIPTION OF THE PREFERRED EMBODIMENTS

Figure 1:
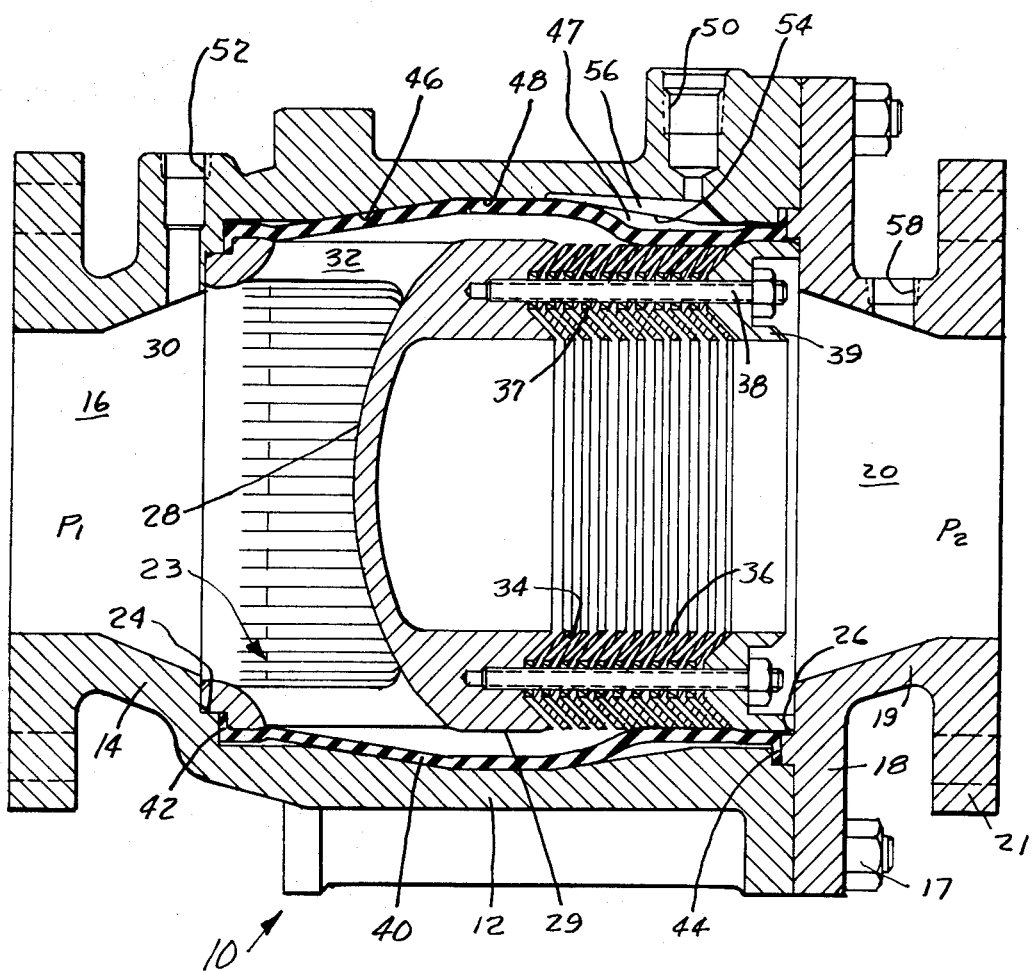
FIG. 1 is a section view of one embodiment of expansible tube type valve shown, velocity retarding flow openings in a core sleeve.

The Embodiment of FIG. 1

Referring now to FIG. 1, the expansible tube type valve or regulator 10 may include a generally cylindrical housing 12 having an upstream hub 14 provided with a central flow passage 16. Secured onto the downstream end of the housing 12 as by means of bolts 17, is a body closure 18 carrying a downstream hub 19 with an outlet flow passage 20 and a flange 21 for connection into a pipeline (not shown). A core sleeve 23 is positioned within the housing 12 as by seating within circular recesses 24 and 26 which are formed in the upstream wall of the housing 12 and the downstream body closure 18 to provide annular shoulders within which the opposite ends of the core sleeve 23 are retained.

The core sleeve 23 includes a dam or barrier 28 with an outer, cylindrical sealing surface 29. The barrier 28 extends completely across the inside of the sleeve 23 to prevent flow of fluid directly therethrough, the flow around the barrier is permitted by a series of longitudinal inlet slots 30 intermediate ribs 32. Outlet openings 34 are formed between a plurality of annular members 36 closely spaced by washers 37 carried on a number of studs 38 around the core sleeve.

The openings 34, the central barrier 28 and the annular members 36 are normally snugly embraced by an expansible tube or sleeve 40 having an inturned flange 42 at the upstream end that is clamped and sealed between the core sleeve 23 and the body 12, and an outturned flange 44 at the downstream end that is clamped between the body 12 and the downstream closure plate 18.

Adjacent the upstream end of the inlet series of slots 30, the inner surface of the regulator body 12 is tapered outward at 46 to form a central control chamber or jacket 47 defined in part by a larger diameter, generally cylindrical inner surface 48. A control fluid may be delivered to the chamber through a port 50 from a suitable source such as the upstream flow passage 16 from which the fluid may be tapped off through the port 52. Thus, in operation, the control pressure in the chamber augments the hoop tension in the stretched resilient sleeve or tube 40 normally to seal against the outer surface 29 of the central barrier 28 and prevent any flow of fluid around it. However, should the pressure of the control fluid in the chamber 47 be reduced to a level wherein the upstream pressure can overcome the tube tension, the tube 40 is expanded away from the sealing surface 29 as shown in FIG. 1 to permit flow of fluid out through the slots 30, around the barrier 28 in through the downstream openings 34 and out the downstream passage 20. With the control fluid inlet 50 opening into the expansion limiting surface 54 near the downstream end, a groove 56 is provided from the control gas inlet 50 to the full expansion chamber 47 so as to insure the free and continuous exposure of the tube 40 to the control gas even though the tube 40 is expanded into firm contact with the blocking surface 54.

The operation of the structure as thus far described will now be described. With the downstream pressure in the outflow passage 20 at the desired level, the expansible tube 40 is in its sealing position shown in FIG. 1 with the chamber 47 loaded through the port 50, balancing the pressure $P_1$ in the upstream flow passage 16. In this condition, the hoop tension in the tube stretched around the sealing surface 24 is sufficient to maintain a seal and prevent flow from upstream flow passage 16 to the downstream 20.

In the event that downstream pressure $P_2$ falls below the desired level, the chamber 47 is evacuated through the port 50 by suitable valve means (not shown) and bled through the port 58 into the downstream flow passage 20. This enables the upstream pressure $P_1$ to overcome the pressure in the jacket 47 and expand the tube 40 outward to commence flow out through the slots 30, around the barrier 28 and in through the spaces 34 to the downstream passage 20. If the downstream pressure again reaches the desired level, the chamber 47 is again loaded to balance the pressure in the upstream line 16 and allow the expansible tube 40 to contract into firm sealing engagement around the barrier. In conditions of continuous flow, the pressure in the jacket 47 is normally at an intermediate level and there is throttled flow around the barrier 28.

As a particular feature of this invention, downstream slots 30 and ribs 32 are replaced by the annular members 36 which are closely spaced by relatively thin washers 37 to provide the flow passages 34. The annular members 36 and washers 37 are clamped against the downstream side of the barrier 28 by a ring 39 secured by the studs 38. The close spacing of the relatively wide annular members 36 provides a high length to cross section ratio of the flow passages 34 which greatly retards the velocity of fluid flowing between them. The length to cross section ratio may be further increased by bending the annular member out of planar configuration so that the flow paths are not truly radial. As shown in FIG. 1, they may have a generally V-shaped configuration. In any event, the resultant retardation of fluid velocity minimizes the noise level of fluid flowing through the downstream spaces 34.

The Embodiment of FIG. 2

In FIG. 2, the annular members 60 are of planar configuration and the high length-to-cross section ratio of the flow passage 62 is achieved merely by closely spacing the annular members by use of the relatively thin washers 37 around the studs 38, the assembly being held by a clamping ring 63.

The Embodiment of FIG. 3

In the embodiment of FIG. 3, the annular members 64 are formed with a plurality of annular grooves 66 and 68 around their faces with at least some of the grooves in alignment whereby a gas flowing radially through the passages 70 sequentially will undergo expansion and contraction stages which further retard flow velocity and provide silent flow. In addition, the annular members may be of V-shaped configuration to increase the length of the flow path within the space limitations within the jacket surface 48.

The Embodiment of FIG. 4

In the embodiment of FIG. 4, the length of the flow paths 72 between the annular members 74 is maximized by forming the annular members 74 with a series of convolutions. At least some of the concave surfaces 75 oppose convex surfaces 76 to form a circuitous flow path winding between the members 74. This increases the length and minimizes the velocity.

The Embodiment of FIG. 5

In the embodiment of FIG. 5, the annular members 77 are separated by a plurality of porous annular members 78 which retard flow. The porous intermediate annular members greatly reduce the cross section of the flow path and the circuitous path is lengthened. In addition, the wires in the screen 78 produces repeated diversion of the flow path into a more circuitous path and with the spaces between them sequentially constrict and allow expansion of the fluid for further flow losses.

Figure 6:
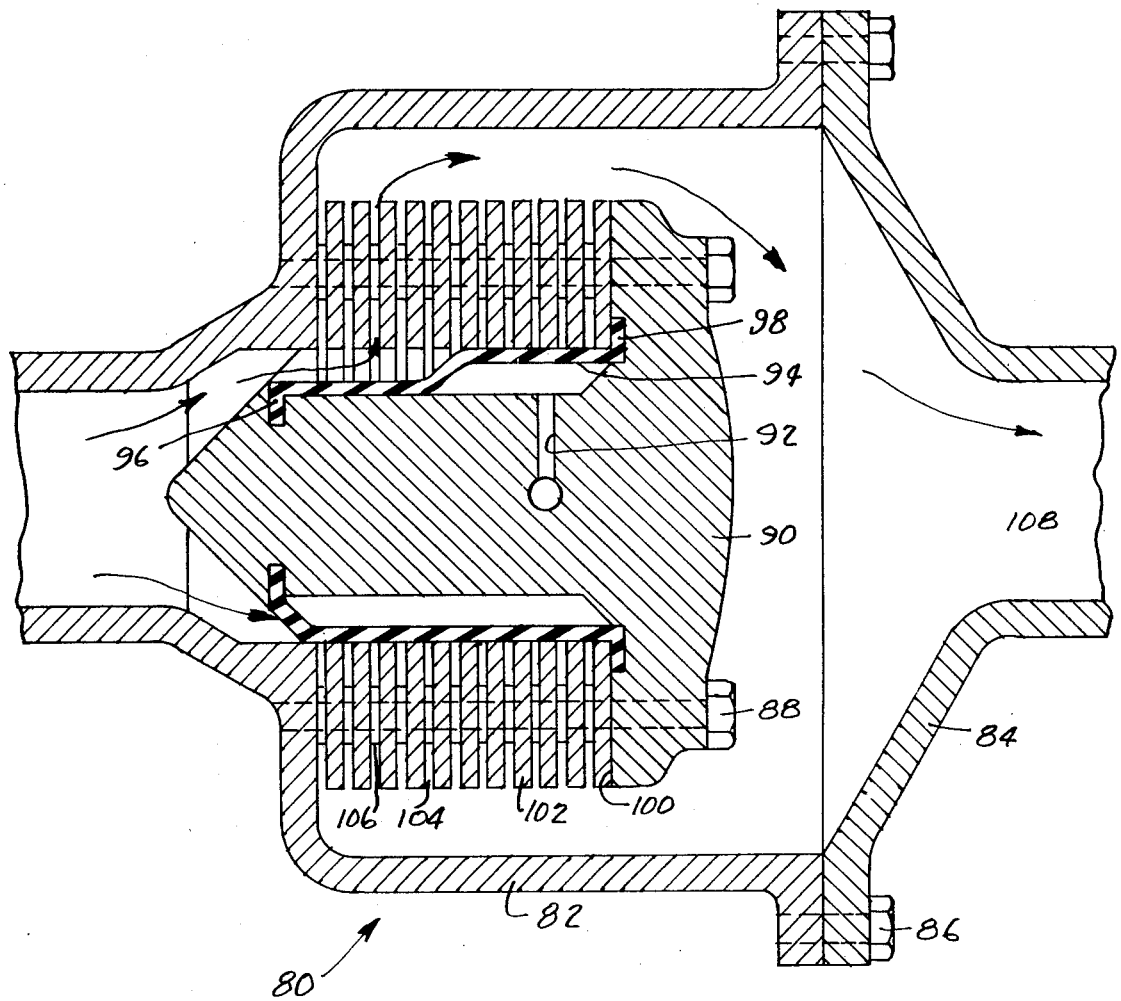
FIG. 6 is a section view of a flexible tube valve which is expanded to seal.

The Embodiment of FIG. 6

In the embodiment of FIG. 6, the invention is incorporated into an expansible tube valve 80 of a configuration opposite to that in FIGS. 1–5. The valve 80 may include a generally cylindrical body 82 with a downstream end closure 84 secured to the body as by means of bolts 86. Secured within the body 82 by means of bolts 88 is a central core 90, with a flow passage 92 extending from a source of pilot fluid pressure (not shown) to the interior of an expansible tube 94. The expansible tube has an upstream inturned flange 96 sealed around the central core and an outturned downstream flange 98 clamped between a flange 100 on the core and a plurality of annular members 102, providing flow passages 104 between them, as by separating them with washers 106 around the bolts 88.

In the operation of the valve of FIG. 6, the controlled pressure within the duct 92 normally urges the expansible tube 94 outward into sealing engagement with the inner surfaces of the annular members 102. However, if the control pressure is decreased below that of the upstream pressure, the flexible tube 94 is rolled inward from the upstream end, as shown at the top of the core in FIG. 6, to permit flow through the annular members in the directions indicated by the arrows to the downstream flow passage 108. Again, the narrow spaces 104 between the annular members greatly retard flow velocity for silent operation.

The Embodiment of FIG. 7

In the valve embodiment 110 of FIG. 7, the core 90 of FIG. 6 is replaced by a cylinder 111 carrying a piston like member 112 around which is secured the inturned flange 114 of the flexible tube 116, the outturned flange 118 at the downstream end is clamped between the end wall 120 of the cylinder and an adjacent annular member 122. The cylinder is sealed around a piston rod 124 as by means of an O-ring 126. The piston rod may be reciprocated by many suitable means (not shown) to operate in a manner to be described. The rod 124 is normally disposed to the left in FIG. 7 with an expansible tube 116 in firm engagement with the inner surfaces of the annular members 122. However, when the rod is moved toward the right, to the position shown in FIG. 7, the tube 116 is rolled back away from the annular members 122 to permit flow of fluid through the space 128 as shown by the arrows.

While this invention has been described in conjunction with preferred embodiments thereof, it is obvious that modifications and changes therein may be made by those skilled in the art without departing from the spirit and scope of this invention.

What is claimed is:

1. A flexible tube valve comprising:
   a housing having inlet and outlet flow passages,
   a cylindrical sleeve secured in said housing with the interior thereof in direct communication at one end thereof with one of said flow passages,
   a barrier across the other end of said sleeve,
   a flexible tube engageable over a cylindrical surface of said sleeve,
   means for urging said tube into sealing engagement with said cylindrical surface,
   a plurality of closely spaced, axially aligned thin imperforate annular members forming said sleeve,
   a plurality of bolts extending through the annular faces of said spaced members and secured to said barrier, and
   a plurality of spacers around said bolts and disposed intermediate successive spaced members forming a plurality of generally radial flow paths with a high length to cross-sectional dimension ratio between said spaced members.

2. The flexible tube valve defined by claim 1 wherein:
   said spaced members are non-planar to increase the flow path length between the exterior and interior of said aligned annular members.

3. The flexible tube valve defined by claim 1 wherein:
   said annular members have a plurality of annular convolutions.

4. The flexible tube valve defined by claim 3 wherein:
   at least some of the convolutions in adjacent annular members are aligned to provide serpentine flow paths between them.

5. The flexible tube valve defined by claim 3 wherein:
   concave portions of at least some of the convolutions in adjacent annular members oppose each other to provide a series of expansion chambers radially across said annular members.

6. The flexible tube valve defined by claim 1 wherein:
   said spacers comprise porous annular members arranged alternately with said imperforate annular members.

7. The flexible tube valve defined by claim 6 wherein:
   said porous annular members are formed of screening.

8. The flexible tube valve defined by claim 1 wherein:
   said flexible tube is stretched over the external surface of said cylindrical sleeve,
   and including:
   a port in said housing for introducing a control pressure around said flexible tube to seal said tube around said sleeve.

9. The flexible tube valve defined by claim 1 wherein:
   said flexible tube is disposed in juxtaposition with the internal surface of said cylindrical sleeve,
   and including:
   a cylindrical protuberance on said barrier extending within said sleeve,
   said tube being sealed to said protuberance adjacent said one end of said sleeve, and
   means for introducing a control pressure between said tube and said protuberance to urge said tube against the internal surface of said sleeve.

10. The flexible tube valve defined by claim 1 wherein:
    said flexible tube is disposed in juxtaposition with the internal surface of said cylindrical sleeve,
    and including:
    a valve operator mounted in said housing for reciprocation within said sleeve,
    said tube being secured at one end thereof to said operator to roll away from and into sealing engagement with said internal surface with reciprocation thereof.

* * * * *